Nov. 5, 1957  C. G. STECKER  2,811,885
AUTOMATIC FORM TOOL HOLDER FOR LATHES
Filed Aug. 19, 1953  3 Sheets-Sheet 1
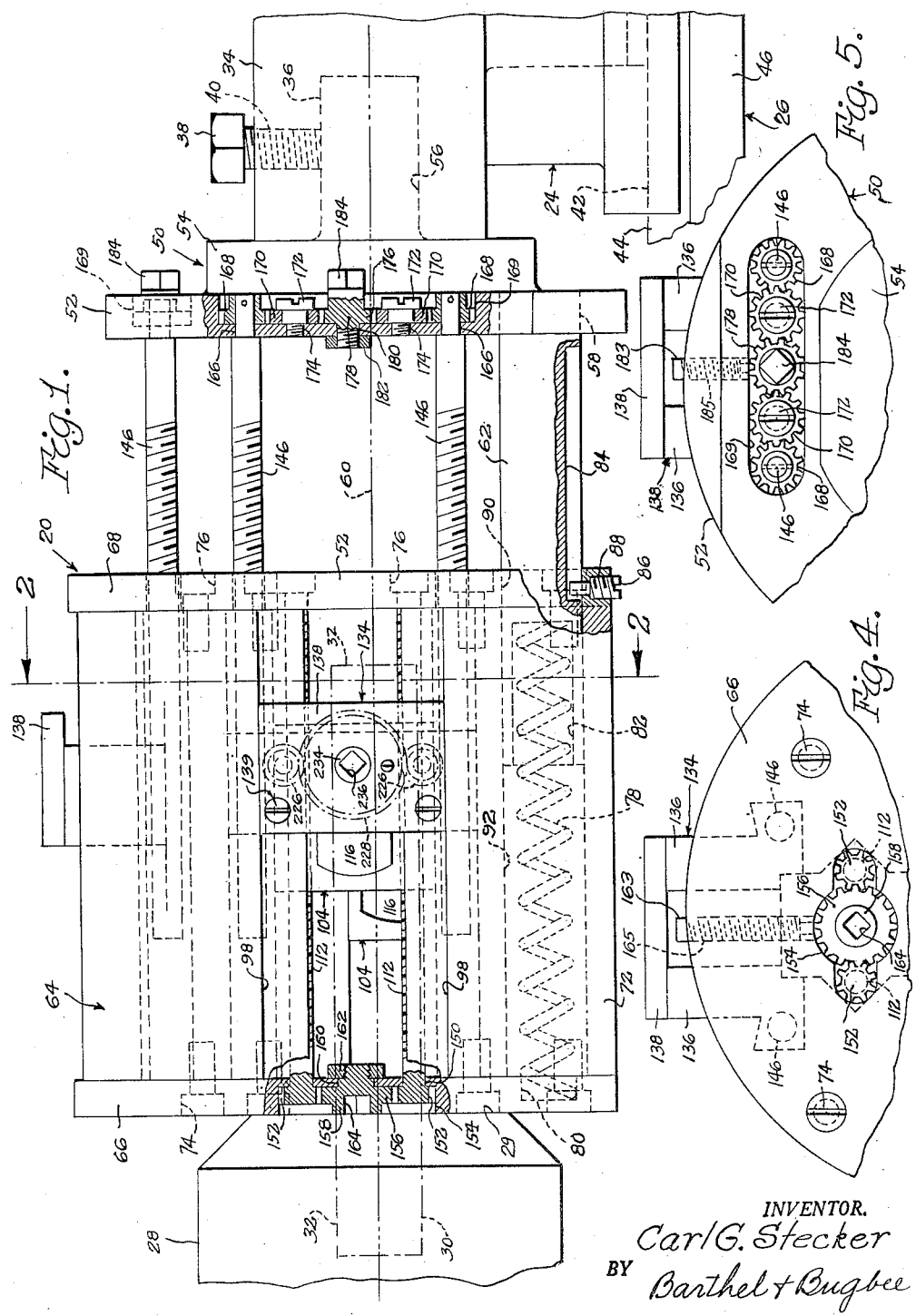
INVENTOR.
Carl G. Stecker
BY Barthel & Bugbee
Attys Nov. 5, 1957 C. G. STECKER 2,811,885
AUTOMATIC FORM TOOL HOLDER FOR LATHES
Filed Aug. 19, 1953 3 Sheets-Sheet 2
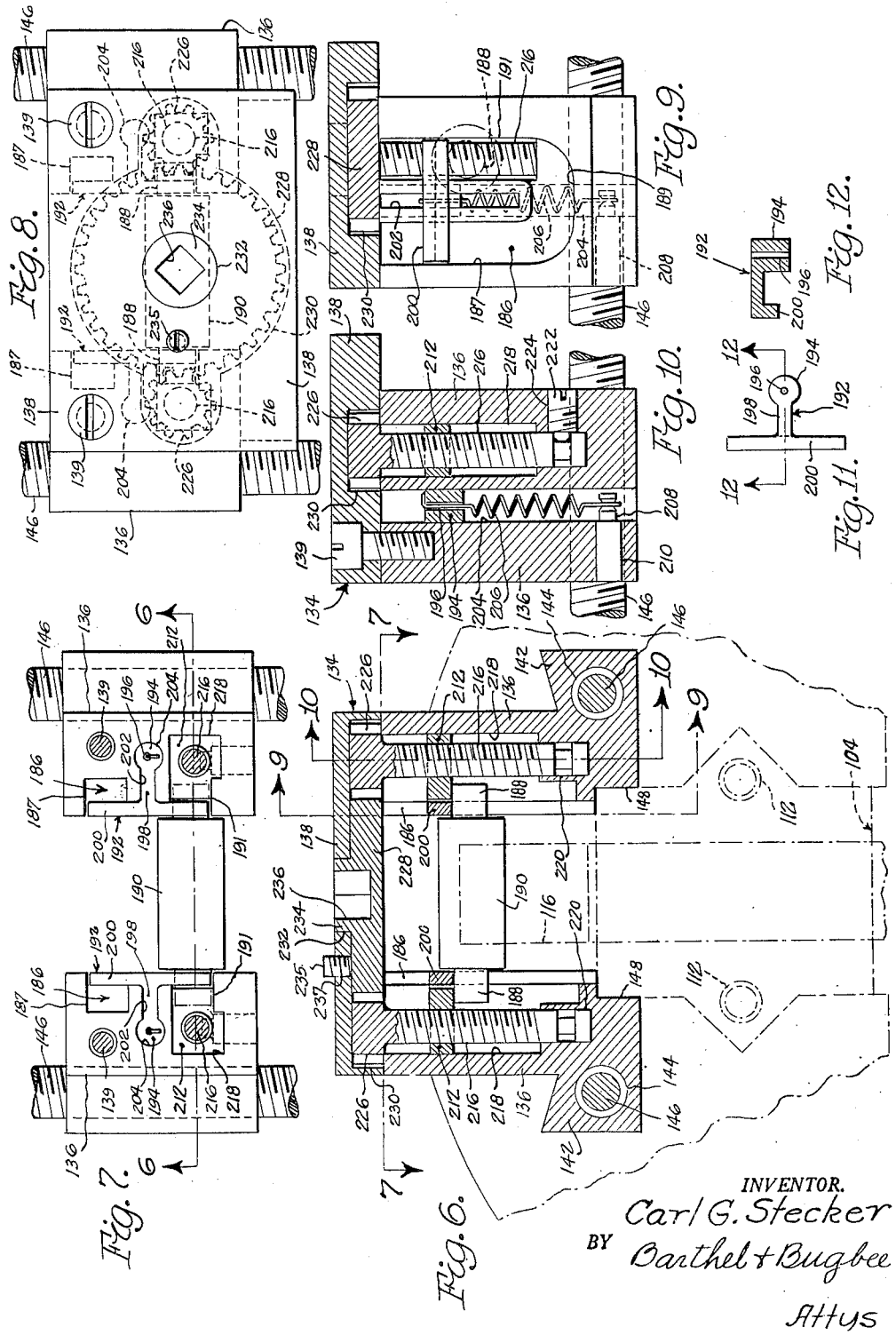
INVENTOR.
Carl G. Stecker
BY Barthel + Bugbee
Attys

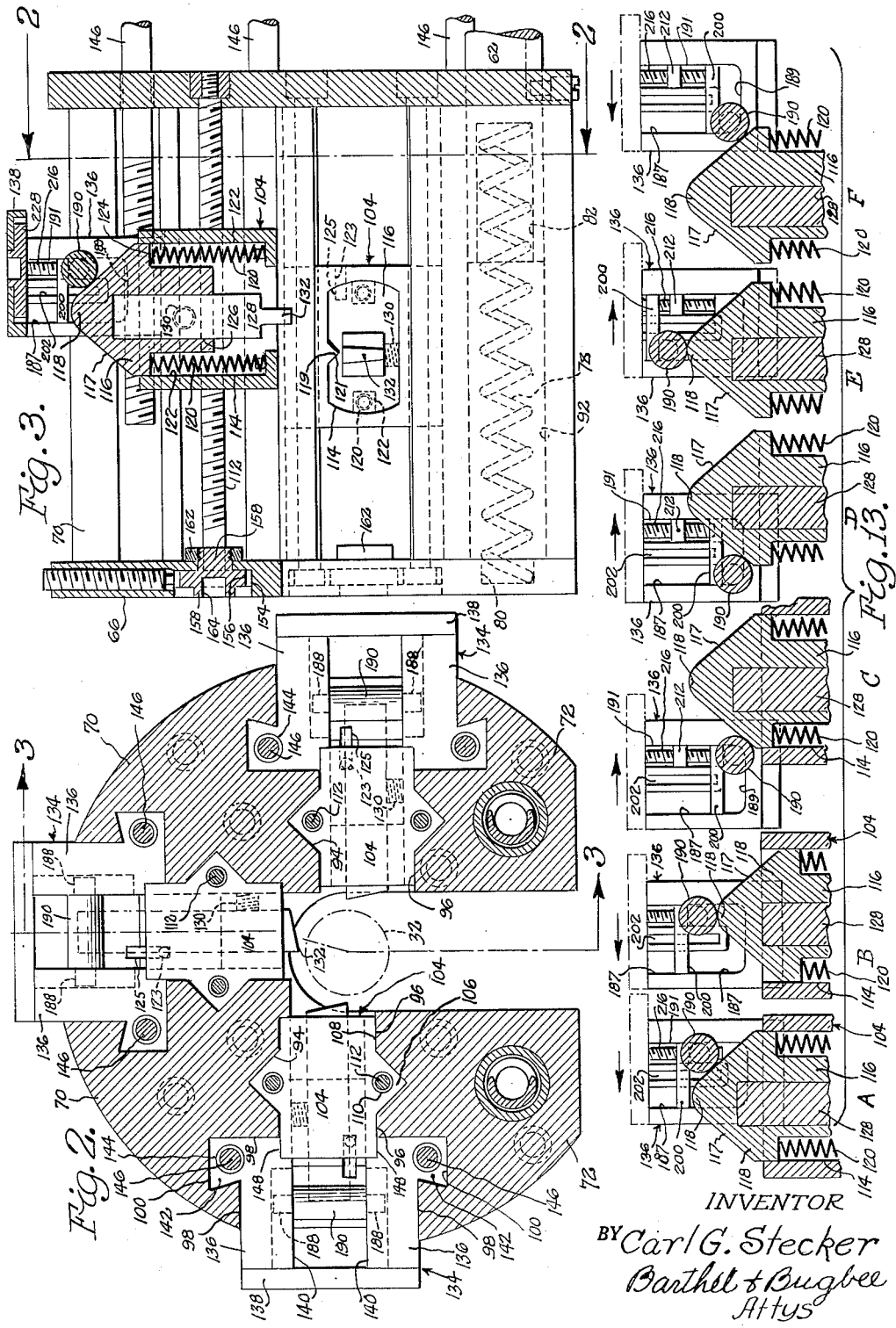

United States Patent Office 2,811,885
Patented Nov. 5, 1957

2,811,885

AUTOMATIC FORM TOOL HOLDER FOR LATHES

Carl G. Stecker, Northville, Mich.

Application August 19, 1953, Serial No. 375,189

5 Claims. (Cl. 82—24)

This invention relates to tool holders and, in particular, to form tool holders for lathes, especially turret lathes.

One object of this invention is to provide an automatic form tool holder for lathes, especially turret lathes, wherein one or more cutting tools is automatically advanced radially at right angles to the work while the turret of the lathe in which this tool holder is mounted travels along the lathe bed toward the chuck or other work holder in the live spindle head until the tool holder encounters a stop or other abutment which halts a portion of it, whereupon the continuing travel of the lathe turret and remaining portion of the tool holder causes the cutting tool or tools to move radially inward to cut the workpiece successively or simultaneously at the same or different locations along the workpiece.

Another object is to provide an automatic form tool holder of the foregoing character having means therein for precisely adjusting and accurately positioning the location along the workpiece at which the cutting tool commences to move inward to make its cut, so as to accurately position the cut portion at a predetermined location in the workpiece.

Another object is to provide an automatic form tool holder wherein the cutting tool is automatically retracted on the retraction stroke of the tool holder, so that it does not engage the workpiece on the return stroke of the tool holder.

Other objects and advantages of the invention will become apparent during the course of the following description of the accompanying drawings, wherein:

Figure 1 is a side elevation, partly in vertical section, of an automatic form tool holder, according to the invention, as installed in a lathe;

Figure 2 is a vertical cross-section taken along the line 2—2 in Figure 1, showing the cutting tool holders and their adjusting and actuating mechanisms;

Figure 3 is a substantially central longitudinal section taken along the line 3—3 in Figure 2;

Figure 4 is a fragmentary left-hand end elevation of the lower portion of the tool holder shown in Figure 1;

Figure 5 is a fragmentary right-hand end elevation of the upper portion of the tool holder shown in Figure 1;

Figure 6 is a central vertical section through one of the cutting tool holders and its adjusting mechanism, taken along the line 6—6 in Figure 7;

Figure 7 is a horizontal section through one of the cutting tool holders taken along the line 7—7 in Figure 6;

Figure 8 is a top plan view of the cutting tool holder shown in Figure 6;

Figure 9 is a vertical section through the cutting tool holder of Figure 6, taken along the line 9—9 therein;

Figure 10 is a vertical section through the cutting tool holder of Figure 6, taken along the line 10—10 therein;

Figure 11 is a top plan view of one of the roller axle contacting members of Figures 6 and 7;

Figure 12 is a central vertical section through the roller axle contacting member of Figure 11, taken along the line 12—12 therein; and Figure 13 is a diagrammatic longitudinal sectional view similar to the upper central portion of Figure 3, showing the successive positions of the cutting tool holder and actuating roller at various stages in the cycle of operation during the cutting and retracting strokes thereof.

Referring to the drawings in detail, Figure 1 shows an automatic form tool holder, generally designated 20, according to one form of the invention as mounted in the turret or head 34 on the carriage 24 of a lathe 26, such as a turret lathe, having a rotary live spindle chuck or other work holder 28 with a socket or recess 30 for receiving a workpiece 32 to be operated upon by the tool or tools in the tool holder 20. The lathe 26 is conventional and its details are well-known to workers in the mechanical industries. The head 34 is provided with a socket 36 in which the tool holder 20 is clamped by means of a cap screw 38 threaded into a bore 40 communicating with the socket 36. The lathe carriage 24 has the usual grooved portion 42 engaging elongated machined ways 44 of corresponding cross-section, the ways 44 extending lengthwise along the lathe bed 46 parallel to the axis of rotation of the live spindle work holder 28.

The device 20 of the invention is supported as a whole by a base or mount, generally designated 50, consisting of a disc-shaped plate 52 having a central boss 54 from which a shank 56 extends rearwardly into the socket 36 which it is shaped to fit, and is clamped fixedly in position by the cap screw 38. Projecting forwardly from the mount 50 and seated in parallel bores 58 therein parallel to the axis of rotation 60 of the workpiece 32 are two parallel rigid shafts 62 (only one shaft 62 being shown in Figure 1) upon which an approximately cylindrical cutting tool carrier support or unit, generally designated 64, is reciprocably mounted.

The unit 64 consists of front and back plates or discs 66 and 68 interconnected by four elongated guide bars or guide blocks consisting of an upper pair of guide blocks 70 and a lower pair of guide blocks 72 (Figure 2) secured thereto by the screws 74 and 76 respectively. The guide blocks of each pair are similar to one another but differ from the guide blocks of the other pair and are of roughly quadrant-shaped cross-section. Compression springs 78 disposed between sockets 80 in the front plate 66 and sockets 82 in the forward ends of the shafts 62 normally urge the unit 64 along the shafts 62 away from the mount 50. The sliding motion of the unit 64 relatively to the shafts 62 is limited in one or both shafts by an elongated groove 84 (Figure 1) in the shaft 62 engaged by a stop screw 86 threaded into a threaded bore 88 in the back plate 68. The back plate 68 and the lower pair of guide blocks or bars 72 are provided with aligned bores 90 and 92 (Figure 1) which slidably receive the shafts 62.

The upper and lower pairs of guide blocks or bars 70 and 72 both have opposed V-shaped inner guide grooves 94 (Figure 2) facing one another and flanked on each side by elongated inner guide faces 96, the guide grooves 94 and faces 96 being disposed parallel to the axis of rotation 60. Disposed adjacent the V-grooves 94 and guide faces 96 are outer dovetail guide rabbets 98 with dovetail guide grooves 100 therein likewise disposed parallel to the axis of rotation 60. Slidably mounted in the inner guide grooves 94 for motion lengthwise of the unit 64 parallel to the axis of rotation 60 are three tool carrier mounts 104 having laterally-extending V-shaped projections 106 and guide surfaces 108 which slidably engage the V-shaped guide grooves 94 and guide faces 96. Each tool carrier mount 104 has a pair of parallel threaded holes 110 disposed with their axes parallel to the axis of rotation 60 and threadedly receiving parallel rotary shafts 112 for moving the tool holder mounts 104 to and fro in the guide grooves 94 in directions parallel to the axis of rotation 60.

Each tool holder mount 104 contains a bore 114 of elongated cross-section (Figure 3) disposed perpendicularly to the axis of rotation 60 (Figure 2) in which is slidably mounted a tool carrier 116 in the form of a block of correspondingly-elongated cross-section having a roughly triangular cam surface 117 at the upper end 118 by which the tool carrier 116 is reciprocated in the bore 114 radially toward and away from the axis of rotation 60. A V-shaped projection 119 extends from the tool carrier mount 104 into its bore 114 and engages a corresponding guide groove 121 in the tool carrier 116. Compression coil springs 120 mounted in elongated pockets 122 in the tool carrier mount 104 on opposite sides of the tool carrier 116 normally urge the latter outwardly away from the axis of rotation 60, the tool carrier 116 having aligned shoulders 124 serving as abutments for the outer ends of the springs 120. A stop screw or pin 123 seated in the tool carrier mount 104 engages a notch 125 (Figures 2 and 3) in the triangular cam portions 118 of the tool carrier 116 and prevents the latter from being expelled from the bore 114 by the springs 120. Each tool carrier 116 is provided with a radial socket 126 in which a tool bit 128 is clamped, as by the set screw 130. The tool bit 128 has a sharpened cutting tip 132 adapted to engage and cut the work-piece 32.

Slidably mounted in the opposing dovetail rabbets 98 and dovetail guide grooves 100 are inverted U-shaped roller carriages, generally designated 134, having parallel side arm portions 136 interconnected by an outer bridge portion 138 bolted or otherwise secured thereto as at 139 (Figure 1). The side arm portions 136 have parallel inner guide faces 140 spaced apart from one another by the width of the tool carrier 116 so as to slidably receive the triangular upper end 118 thereof between them. The side arm portions 136 have lateral projections or extensions 142 of dovetail cross-section (Figure 2) snugly but slidably fitting into the dovetail grooves 100 so as to travel therein, and are provided with threaded holes 144 disposed with their axes parallel to the axis of rotation 60 for receiving parallel screw shafts 146 threaded therethrough for reciprocating the roller carriages 134 along the guide rabbets 98 parallel to the axis of rotation 60. The side arm portions 136 at their inner ends are also rabbeted at 148 to receive the correspondingly-shaped outer ends of the tool carrier mounts 104.

To rotate the inner screw shafts 112 and consequently reciprocate the tool carrier mounts 104 along their guideways 94, the screw shafts 112 at their forward ends are journaled in parallel bores 150 (Figure 1) and have pinions 152 pinned or otherwise secured thereto in a recess 154 in the forward plate 52 (Figures 1 and 4). The pinions 152 mesh with a common central gear 156 disposed between them in the recess 154. The gear 156 has a hub 158 journaled in a central hole 160 and held in position by a retaining nut 162 threaded upon the inner end thereof. The gear 156 is provided with a central socket 164 of polygonal cross-section for receiving the correspondingly-shaped end of an adjusting wrench or crank (not shown) by which the gear 156 and consequently the pinions 152 may be rotated to simultaneously rotate the screw shafts 112 and move the tool carrier mounts 104 back and forth in their guide grooves 94 parallel to the axis of rotation 60. The gear 156 may be locked in position by a set screw 163 threaded through a threaded hole 165 in the plate 66, to prevent accidental alteration of this adjustment.

The outer screw shafts 146, on the other hand, are journaled in bores 166 (Figure 1) in the rearward plate 52 of the supporting head 50 and on their outer ends have pinions 168 pinned or otherwise secured thereto. The pinions 168 mounted in a recess 169 in the plate 52 mesh with idler pinions 170 mounted on pivot screws 172 threaded into threaded holes 174. The idler pinions 170 are also located in the recess 169 and mesh with a central adjusting pinion 176 having a hub 178 journaled in a hole 180 in the plate 52 and threaded to receive a retaining nut 182. The central adjusting pinion 176 on the opposite side thereof from its hub 178 is provided with a projection 184 of polygonal cross-section for receiving an adjusting wrench or crank (not shown) by which the idler pinions 170 are caused to rotate the pinions 168 and the screw shafts 146 and cause the roller carriages 134 to travel along the guide rabbets 98 and dovetail grooves 100. The pinion 178 may be locked in position by a set screw 183 threaded through a threaded hole 185 in the plate 52, to prevent accidental alteration of this adjustment.

Each side arm portion 136 of each roller carriage 134 (Figures 9 and 10) is provided with an outwardly-directed U-shaped groove 186 having forward and rearward elongated portions 187 and 191 and a connecting portion 189 in which the reduced diameter end portions or axles 188 (Figures 2 and 6) of a cam-actuating roller 190 are adapted to travel. Each roller 190 is urged downwardly toward the bottom of the U-shaped groove 186 by a T-shaped pressure arm 192 (Figures 7, 11 and 12). Each pressure arm 192 consists of a cylindrical hub 194 having a hole 196 therein, an arm 198 projecting radially from the hub 194 and a cross bar 200 disposed perpendicularly to the arm 198. The hub 194 and arm 198 reciprocate parallel to a radius drawn to the axis of rotation 60 midway between the guide surfaces 140 of the roller carriage 134 in correspondingly configured guide grooves 202 (Figure 7) of approximately keyhole-shaped cross-section having a portion 204 of circular cross-section in which the hub 194 reciprocates. Anchored in the hole 196 in the hub of the T-shaped pressure arm 192 is one end of a tension spring 206 (Figures 9 and 10), the opposite end of which is anchored to a pin 208 seated in a hole 210 transverse to the bore 204. As a consequence, the cross bar 200 of each T-shaped arm 192 (of which there is a pair, as shown in Figure 7) engages its respective roller axle 188 regardless of which part of the U-shaped groove 186 the axle 188 happens to be traveling in at the moment (Figure 9).

The upward travel of each axle 188 of each roller 190 is limited by a stop 212 (Figures 6, 7 and 10) bored and threaded to receive a screw shaft 216. The screw shafts 216 are mounted in pairs, one in a longitudinal recess 218 of approximately rectangular cross-section in each arm portion 136. The inner ends of the screw shafts 216 are journaled in sockets 220 and are grooved to receive retaining screws 222 threaded into transverse holes 224 (Figure 10). The outer ends of the screw shafts 216 carry pinions 226 either integral therewith or secured thereto (Figures 6 and 8) and the pinions 226 of each associated pair of screw shafts 216 mesh with a common gear 228, the pinions 226 and gear 228 being disposed in a recess 230 in the under side of the bridge member 138. The bridge member 138 is also provided with a central bore 232 in which the hub 234 of the gear 228 is journaled, the hub 234 also having a wrench socket 236 of polygonal cross-section for receiving an adjusting wrench or crank (not shown). The gear 228 may be locked in position by a set screw 235 threaded through a threaded hole 237 in the bridge member 138 to prevent accidental alteration of this adjustment.

In the operation of the invention, let it be assumed that the device 20 is mounted with its shank 56 in the socket 36 of the lathe carriage head or turret 34 and that the carriage 24 is started in motion along the guideways 44 toward the work holder or chuck 28 or the head (not shown) in which it is mounted. The carriage 24 advances along the lathe bed 46 until the front plate 66 of the unit 64 engages the properly lubricated front surface 29 of the work holder 28 or, if a stationary stop is preferred, the head or stationary mount or an abutment adjacent the chuck or work holder 28. In either event, the unit 64 halts in this manner, whereupon the tool carrier mounts 104 on the screw shafts 112 also halt. The roller carriages 134, however, continue to advance because the lathe carriage 24 continues to advance, pushing the supporting head or mount 50 forward relatively to the halted unit 64. This causes the roller carriages 134 mounted on the screw shafts 146 attached to the supporting head or mount 50 to be pushed along their guide rabbets 98 and dovetail grooves 100, occupying the successive positions shown from A to F in Figure 13 during a forward or cutting stroke and a return or retraction stroke. Position A of Figure 13 corresponds to the same position of the parts in Figure 3, with the cam-operating roller 190 starting to climb the triangular cam head 118 of the tool carrier 116.

As the roller carriage 134 continues to travel in the direction of the arrows from position A to position B of Figure 13, the roller 190, which is in the rearward arm 191 of the U-shaped groove 186 adjacent the stop 212, is held thereby from rising in that arm, hence the roller 190 in traveling over the cam surface 117 pushes the head 118 of the tool carrier 116 radially inward along the bore 114, causing the cutting tip 132 of the tool bit 128 to execute the cut in the workpiece 32. The motion of the lathe carriage 24 and roller carriage 134 continues in the direction of the arrow until the roller 190 of each descends the far side of the triangular cam surface 117, to position C of Figure 13, enabling the tool carrier 116 and cutting tool 128 to move outward. The lathe carriage 24 continues to travel forward and the unit 64 approaches the supporting head 50 until the motion of the carriage 24 is halted and reversed by the usual conventional means, either manually or automatically, whereupon the return or retraction stroke of the lathe carriage 24 commences.

At the beginning of the retraction stroke, the cam-operating roller 190 is at the right-hand or rearward end of the connecting portion 189 of the U-shaped groove 186 and as the lathe carriage 24 moves backward on its return stroke, the roller 190 of each roller carriage 134 moves forwardly along the connecting portion 189 of the groove 186 from the position C to position D of Figure 13. As the lathe carriage 24 continues to return along its ways 44, in the direction of the arrows, each roller 190 is then pushed upward into the forward arm portion 187 of the U-shaped groove 186 by the triangular cam surface 117 of the head 118, so that the cutting tool 128 does not re-engage the workpiece upon this return or retraction stroke. The roller carriage 134 then moves from position D through position E to position F of Figure 13, whereupon the roller 190 descends in the forward arm portion 187 of the groove 186 to the bottom connecting portion 189 thereof, ready to begin another cycle starting at position A in the rearward arm portion 191 of Figure 13.

The distance along the workpiece 32, measured from the front surface 29 of the work holder 28, at which the cutting tool 128 makes its cut, is adjusted by applying a wrench to the socket 164 in the gear 156, rotating the screw shafts 112 to move the tool carrier mount 104 toward or away from the forward plate 66 of the unit 64 which engages the face 29 of the chuck 28. The location in the travel of the carriage 24 at which the rollers 190 will engage their respective cam surfaces 117 of the tool carriers 116 is determined by adjusting the roller carriages 134 along the screw shaft 146 by applying a wrench or crank to the squared portion 184 of the central pinion 176, thereby rotating the screw shafts 146 to move the roller carriages 134 back and forth relatively to the supporting mount or head 52. The position of the stop 212 of each roller carriage 134 is adjusted by applying a wrench or crank to the socket 236 in the gear 228 (Figures 6 and 8), thereby rotating the gear 228 and pinions 226 to simultaneously rotate the screw shafts 216 to move the stops 212 therealong (Figure 6). This determines the location at which the axles 188 of the rollers 190 will be halted by the stops 212 of each roller carriage 134.

What I claim is:
1. An automatic form tool holder for a machine tool having a rotary work holder and a carriage movable longitudinally toward and away from said work holder, said tool holder comprising a base attachable to said carriage for travel therewith and having a plurality of first longitudinal guideways extending toward said work holder, a tool carrier support structure including a pair of longitudinally-spaced wall portions and a plurality of circumferentially-spaced guide portions interconnecting said wall portions on opposite sides of the axis of rotation of said work holder, said tool carrier support structure being reciprocably mounted on said first longitudinal guideways for travel longitudinally therealong relatively to said base, said guide portions having second longitudinal guideways thereon disposed parallel to the axis of rotation of said work holder, a tool carrier mount reciprocably mounted in each second guideway for travel therealong, each tool carrier mount having a transverse guideway thereon extending toward the axis of rotation of said work holder, a tool carrier reciprocably mounted on each transverse guideway and having means thereon for securing a cutting tool thereto, and tool carrier reciprocating mechanism connected to said base and responsive to the relative motion between said base and tool carrier support for moving said tool carriers transversely toward said axis of rotation.

2. An automatic form tool holder for a machine tool having a rotary work holder and a carriage movable longitudinally toward and away from said work holder, said tool holder comprising a base attachable to said carriage for travel therewith and having a plurality of first longitudinal guideways extending toward said work holder, a tool carrier support including a pair of longitudinally-spaced plates and a plurality of circumferentially-spaced guide bars interconnecting said plates on opposite sides of the axis of rotation of said work holder, said tool carrier support being reciprocably mounted on said first longitudinal guideways for travel longitudinally therealong relatively to said base, said guide bars having second longitudinal guideways thereon disposed parallel to the axis of rotation of said work holder, a tool carrier mount reciprocably mounted in each second guideway for travel therealong, each tool carrier mount having a transverse guideway thereon extending toward the axis of rotation of said work holder, adjustment means operatively engaging the tool carrier mounts for adjustably moving said mounts along said second guideways, a tool carrier reciprocably mounted on each transverse guideway and having means thereon for securing a cutting tool thereto, and tool carrier reciprocating mechanism connected to said base and responsive to the relative motion between said base and tool carrier support for moving said tool carrier transversely toward said axis of rotation.

3. An automatic form tool holder for a machine tool having a rotary work holder and a carriage movable longitudinally toward and away from said work holder, said tool holder comprising a base attachable to said carriage for travel therewith and having a plurality of first longitudinal guideways extending toward said work holder, a tool carrier support including a pair of longitudinally-spaced plates and a plurality of circumferentially-spaced guide bars interconnecting said plates on opposite sides of the axis of rotation of said work holder, said tool carrier support being reciprocably mounted on said first longitudinal guideways for travel longitudinally therealong relatively to said base, said guide bars having second longitudinal guideways thereon disposed parallel to the axis of rotation of said work holder, a tool carrier mount reciprocably mounted in each second guideway for travel therealong, each tool carrier mount having a transverse guideway thereon extending toward the axis of rotation of said work holder, a tool carrier reciprocably mounted on each transverse guideway and having means thereon for securing a cutting tool thereto, and tool carrier reciprocating mechanism including a member connected to said base and a tool carrier operator mounted on said member and engageable with said tool carrier, said operator being responsive to the relative motion between said base and tool carrier support for moving said tool carriers transversely toward said axis of rotation, said tool carrier support having a plurality of third longitudinal guideways therein disposed parallel to the axis of rotation of said work holder, each tool carrier operator slidably engaging its respective third guideway.

4. An automatic form tool holder for a machine tool having a rotary work holder and a carriage movable longitudinally toward and away from said work holder, said tool holder comprising a base attachable to said carriage for travel therewith and having a first longitudinal guideway extending toward said work holder, a tool carrier support reciprocably mounted on said first longitudinal guideway for travel longitudinally therealong relatively to said base, said tool carrier support having a transverse guideway thereon extending toward the axis of rotation of said work holder, a tool carrier reciprocably mounted on said transverse guideway and having means thereon for securing a cutting tool thereto, and tool carrier reciprocating mechanism including a member connected to said base and a tool carrier operator mounted on said member and engageable with said tool carrier, said operator being responsive to the relative motion between said base and tool carrier support for moving said tool carrier transversely toward said axis of rotation, said operator including a contact element mounted for travel along an approximately U-shaped guide path having a stop in one arm of said path engageable with said contact element to hold said contact element temporarily in engagement with said tool carrier upon its arrival thereat.

5. An automatic form tool holder for a machine tool having a rotary work holder and a carriage movable longitudinally toward and away from said work holder, said tool holder comprising a base attachable to said carriage for travel therewith and having a first longitudinal guideway extending toward said work holder, a tool carrier support reciprocably mounted on said first longitudinal guideway for travel longitudinally therealong relatively to said base, said tool carrier support having a transverse guideway thereon extending toward the axis of rotation of said work holder, a tool carrier reciprocably mounted on said transverse guideway and having means thereon for securing a cutting tool thereto, tool carrier reciprocating mechanism including a member connected to said base and a tool carrier operator mounted on said member and engageable with said tool carrier, said operator being responsive to the relative motion between said base and tool carrier support for moving said tool carrier transversely toward said axis of rotation, said operator including a contact element mounted for travel along an approximately U-shaped guide path having a stop in one arm of said path engageable with said contact element to hold said contact element temporarily in engagement with said tool carrier upon its arrival thereat, and means for adjustably moving said stop along said guide path.

References Cited in the file of this patent

UNITED STATES PATENTS

| | | |
|---|---|---|
| 739,501 | Meyers | Sept. 22, 1903 |
| 1,678,924 | Strindberg | July 31, 1928 |
| 1,872,817 | Root | Aug. 23, 1932 |
| 2,257,503 | Lange | Sept. 30, 1941 |
| 2,337,530 | Loudon | Dec. 21, 1943 |
| 2,390,312 | Livingstone | Dec. 4, 1945 |
| 2,441,533 | Montgomery | May 11, 1948 |